(12) United States Patent
Gheorma et al.

(10) Patent No.: US 7,953,303 B2
(45) Date of Patent: May 31, 2011

(54) METHOD AND SYSTEM FOR GENERATING FLAT OR ARBITRARY SHAPED OPTICAL FREQUENCY COMBS

(75) Inventors: Ioan L. Gheorma, Pasadena, CA (US); Ganesh K. Gopalakrishnan, Bethesda, MD (US)

(73) Assignee: Thorlabs Quantum Electronics, Inc., Newton, NJ (US)

( * ) Notice: Subject to any disclaimer, the term of this patent is extended or adjusted under 35 U.S.C. 154(b) by 1019 days.

(21) Appl. No.: 11/763,868

(22) Filed: Jun. 15, 2007

(65) Prior Publication Data

US 2011/0007383 A1 Jan. 13, 2011

(51) Int. Cl.
*G02F 1/035* (2006.01)

(52) U.S. Cl. .................................. 385/3; 385/2

(58) Field of Classification Search ............ 385/1–3
See application file for complete search history.

(56) References Cited

U.S. PATENT DOCUMENTS 5,278,923 A * 1/1994 Nazarathy et al. ............. 385/3
2009/0310900 A1 * 12/2009 Sakamoto et al. ............. 385/3

OTHER PUBLICATIONS

"Dual Parallel Mach-Zehnder (DPMZ) Modulator," JDSU, <http://www.jdsu.com>, Nov. 2006.
Abramowitz, et al., "Handbook of Mathematical Functions," New York: Dover, 1964, pp. 355-434.
Davies, B., et al., "Hybrid Modulator Structures for Subcarrier Optical Single Sideband," IEEE Photonics Technology Letters, vol. 10, No. 4, pp. 600-602, Apr. 1998.
Doi, M., et al., "Advanced LiNbO3 Optical Modulators for Broadband Optical Communications," IEEE J. Sel. Topics Quantum Electront., vol. 12, pp. 745-750, Jul. 2006.
Fujiwara, M., et al., "Optical Carrier Supply Module Using Flattened Optical Multicarrier Generation Based on Sinusoidal Amplitude and Phase Hybrid Modulation," J. Lightw. Technol., vol. 21, pp. 2705-2714, Nov. 2003.
Gopalakrishnan, G.K., et al., "Microwave-Optical Mixing in LiNbO3 Modulators," IEEE Trans. Microw. Theory. Tech., vol. 41, pp. 2383-2391, Dec. 1993.
Ho, K.-P., et al., "Optical Frequency Comb Generator Using Phase Modulation in Amplified Circulating Loop," IEEE Photon. Technol. Lett., vol. 5, pp. 721-725, Jun. 1993.
Sakamoto, T., et al., "Optical Frequency Comb Generation Using Asymmetrically Dual-Driven Mach-Zehnder Modulator," in ECOC 2005 Proceedings, vol. 3, pp. 743-744.M.
Suzuki, H., et al., "12.5-GHz Spaced 1.28-Tb/s (512-channel x 2.5 Gb/s) Superdense WDM Transmission Over 320-km SMF Using Multiwavelength Generation Technique," IEEE Photon. Technol. Lett., vol. 14, pp. 405-407, Mar. 2002.
Veselka, J.J., et al., "A Multiwavelength Source Having Precise Channel Spacing for WDM Systems," IEEE Photon. Technol. Lett., vol. 10, pp. 958-960, Jul. 1998.

* cited by examiner

*Primary Examiner* — Hemang Sanghavi
(74) *Attorney, Agent, or Firm* — Graham Curtin, PA

(57) ABSTRACT

A method and system for generating an optical frequency comb that employs a dual parallel modulator that inputs an optical signal at a center frequency of a desired optical frequency comb and an RF signal at a frequency corresponding to a desired spacing of the teeth of the optical frequency comb. The amplitudes of the teeth of the optical frequency comb are controlled by controlling the amplitudes of the two RF inputs to the DPM and the phase shift between the two RF inputs. In some embodiments, the three bias voltages for the three interferometers in the DPM are also controlled. In some embodiments, all three interferometers are all biased at the same point (e.g., quadrature). Preferably, but not necessarily, the three interferometers of the DPM are formed on a single substrate.

25 Claims, 12 Drawing Sheets

METHOD AND SYSTEM FOR GENERATING FLAT OR ARBITRARY SHAPED OPTICAL FREQUENCY COMBS

The present invention relates to a method and system of generating optical frequency combs.

BACKGROUND

An important requirement of dense wavelength-division multiplexed (DWDM) systems is the generation of wavelengths that are closely spaced—usually spaced evenly. Most DWDM systems generate such closely spaced wavelengths by employing multiple discrete lasers at a rate of one per wavelength. For example, in a 100 channel DWDM system, a bank of 100 discrete lasers is employed to generate the 100 different channels. However, such systems are expensive and further do not allow for the close spacing of optical channels. Channel spacing in state-of-the-art DWDM systems based on a bank of discrete lasers, is currently limited to 25 GHz. Therefore, the spectral utilization efficiency of such systems is poor.

Thus, it is desirable to achieve a tunable multiwavelength source that allows for precise wavelength spacing for DWDM applications, and has the advantages of superior spectral efficiency, cost, and simplicity.

SUMMARY

The aforementioned issues are addressed to a great extent by a method and system for generating an optical frequency comb that employs a dual parallel modulator (DPM) that inputs an optical signal at a center frequency of a desired optical frequency comb and a RF signal at a frequency corresponding to a desired spacing of the different channels of the optical frequency comb. The amplitudes of the channels of the optical frequency comb are controlled by controlling the amplitudes of the two RF inputs to the DPM and the phase shift between the two RF inputs. In some embodiments, the three bias voltages for the three interferometers in the DPM are also controlled to control the amplitudes of the channels. In some embodiments, the three interferometers in the DPM are biased at quadrature, at minimum, or at maximum in order to simplify the bias circuitry. In some embodiments, all three interferometers are biased at the same point (e.g., quadrature). Preferably, but not necessarily, the three interferometers of the DPM are formed on a single substrate.

BRIEF DESCRIPTION OF THE DRAWINGS

Reference is made to the attached drawings, wherein elements having the same reference designations represent like elements throughout and wherein.

DETAILED DESCRIPTION OF SEVERAL EMBODIMENTS

Described herein is an approach to generating multiple optical channels especially in applications wherein the channel spacing is $\leq 25$ GHz. The embodiments described below are methods and systems for generating optical frequency combs (OFCs) with precise and tunable frequency spacing using modulation. Such embodiments can generate a variety of arbitrarily shaped spectral responses including flat frequency combs. A commercial off-the-shelf dual-parallel Mach-Zehnder modulator (DPMZM) is preferably employed to generate the optical frequency comb. The DPMZM can be an x-cut, z-cut or y-cut, and can be a fixed chirp or zero-chirp integrated device and is preferably fabricated on a single chip, and thus can eliminate some of the synchronization and phase matching problems of FCGs that use multiple discrete modulators. OFCs generated via modulation require relatively few lasers for generating multiple optical channels. Such frequency combs are scalable, and may have a high output signal-to-noise ratio. Also, a tunable multi-wavelength source based on this approach allows for very precise wavelength spacing for DWDM applications. The wavelengths of an OFC can also be precisely stabilized, tuned, and aligned to an International Telecommunication Union (ITU) grid. Such features provide the advantages of spectral efficiency, simplicity, and low noise in the system.

Figure 1A:
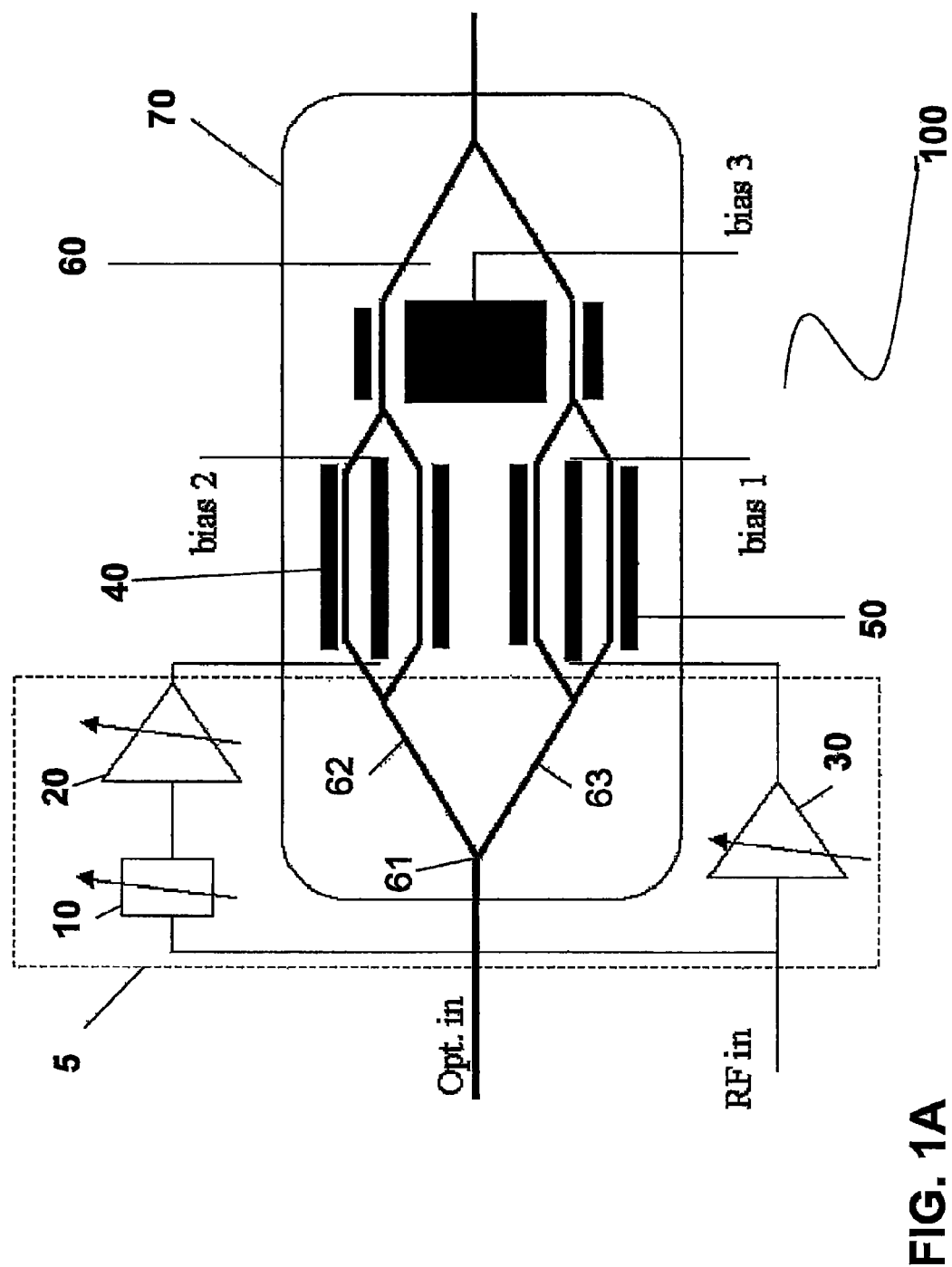
FIG. 1A illustrates an embodiment of an integrated dual parallel modulator system for generating flat and/or arbitrary shaped optical frequency combs, by optimizing bias and drive parameters within the system.

FIG. 1A illustrates an embodiment of an integrated dual parallel modulator system 100 for generating flat optical frequency combs, and/or arbitrary shaped optical frequency combs, by optimizing bias and drive parameters within the system 100. The dual parallel modulator system 100 provides the capability of generating a substantially uniform frequency comb, and other desired spectral shapes if needed or desired. The dual parallel modulator system 100 includes a driver circuit 5 (it should be understood that only the electrical components within the dashed lines shown in FIG. 1A form part of the driver circuit) that comprises at least one phase shifter 10 and variable gain drivers (20, 30). A flat spectral response may be obtained by such a dual parallel modulator system 100 by optimizing the DC bias, the RF drive parameters and the phase shift when the system is driven in the GHz frequency range. As illustrated in FIG. 1A, the dual parallel modulator system 100 also comprises a DPMZM 70 that includes two sub mach-zehnder interferometers (MZIs) 40, 50 that are nested within a third, larger MZI 60. This configuration may provide three bias voltages (i.e., bias 1, bias 2 and bias 3) and two RF inputs (i.e., the RF input to each of the two nested MZIs 40, 50) that can be adjusted, thereby allowing for various combinations of biasing and driving in order to achieve a desired output result.

Figure 1B:
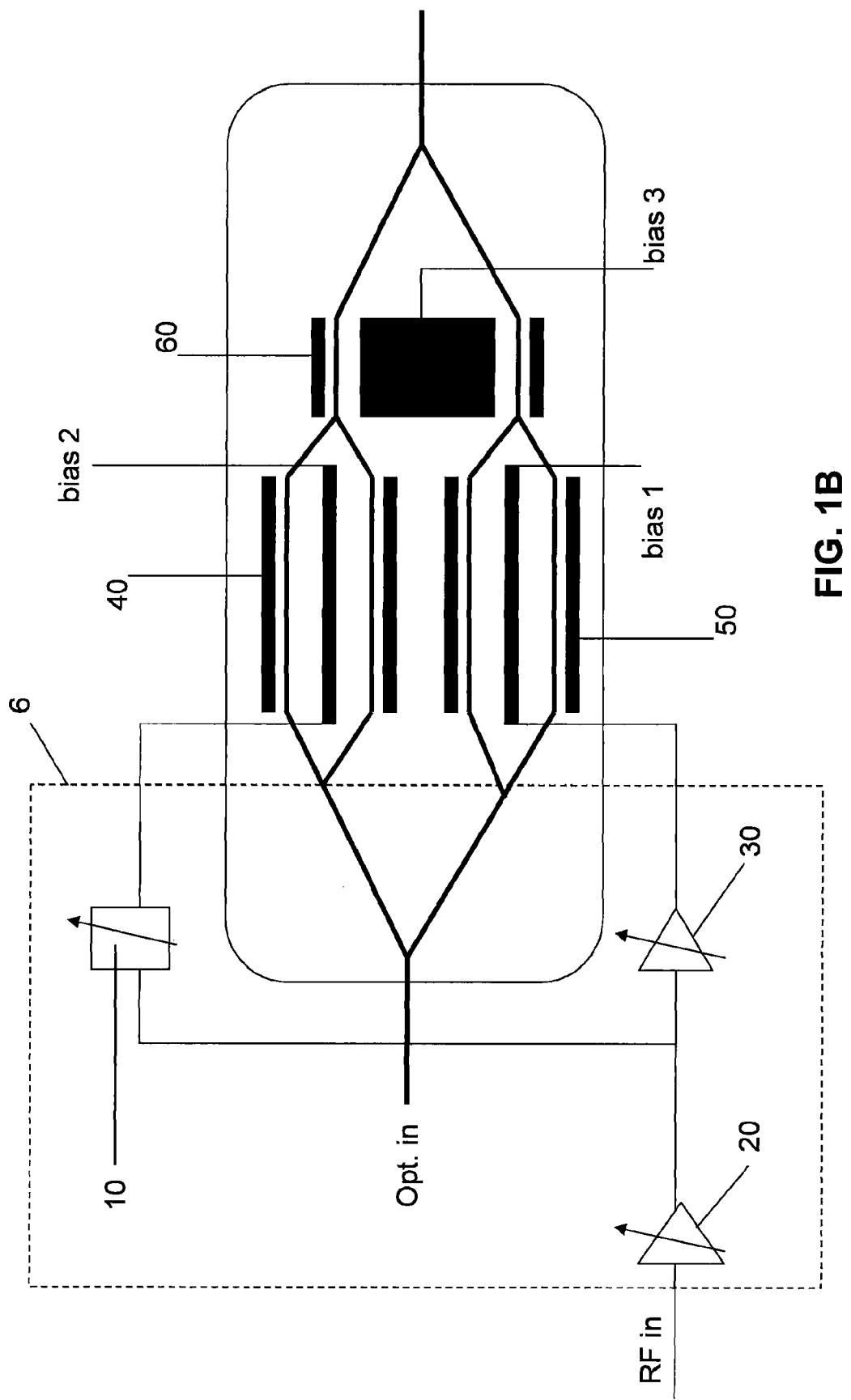
FIG. 1B illustrates another embodiment of an integrated dual parallel modulator system for generating flat optical frequency combs, and/or arbitrary shaped optical frequency combs indicating alternative locations of the variable gain drivers and phase shifter.

FIG. 1B illustrates another embodiment of an integrated dual parallel modulator system 100 for generating flat optical frequency combs, and/or arbitrary shape optical frequency combs wherein alternative locations of the variable gain drivers 20, 30 and phase shifter 10 in the driver circuit 6 are indicated. In this embodiment, the amplitude of an RF electrical input may be varied by variable gain driver 20. The output of the variable gain driver 20 is then split into two electrical signals wherein the phase of one of the split electrical signals may be shifted by phase shifter 10, while the amplitude of the other signal may be varied by variable gain driver 30. Thereafter, the phase shifted electrical signal may serve as an electrical input into the electrical input of MZI 40, while the amplitude varied electrical signal from variable gain driver 30 may serve as input to MZI 50. Also, an optical signal may be input to an optical input of MZI 60. The optical input of MZI 60 is split into two parts at the Y-junction 61. The first part (top arm) 62 serves as the optical input of MZI 40. The second part (lower arm) 63 serves as the optical input to MZI 50. The MZIs 40, 50, 60 may also be provided with three bias voltages (i.e., bias 1, bias 2 and bias 3). The bias voltages and two RF electrical inputs can be adjusted, thereby allowing for some combinations of biasing and driving. Thus, by varying the bias voltages, the relative phase of the electrical signal via phase shifter 10, and the amplitude of the electrical signal via variable gain drivers 20, 30, the optical output of MZI 60 may be configured to produce a desired output spectrum.

Figure 1C:
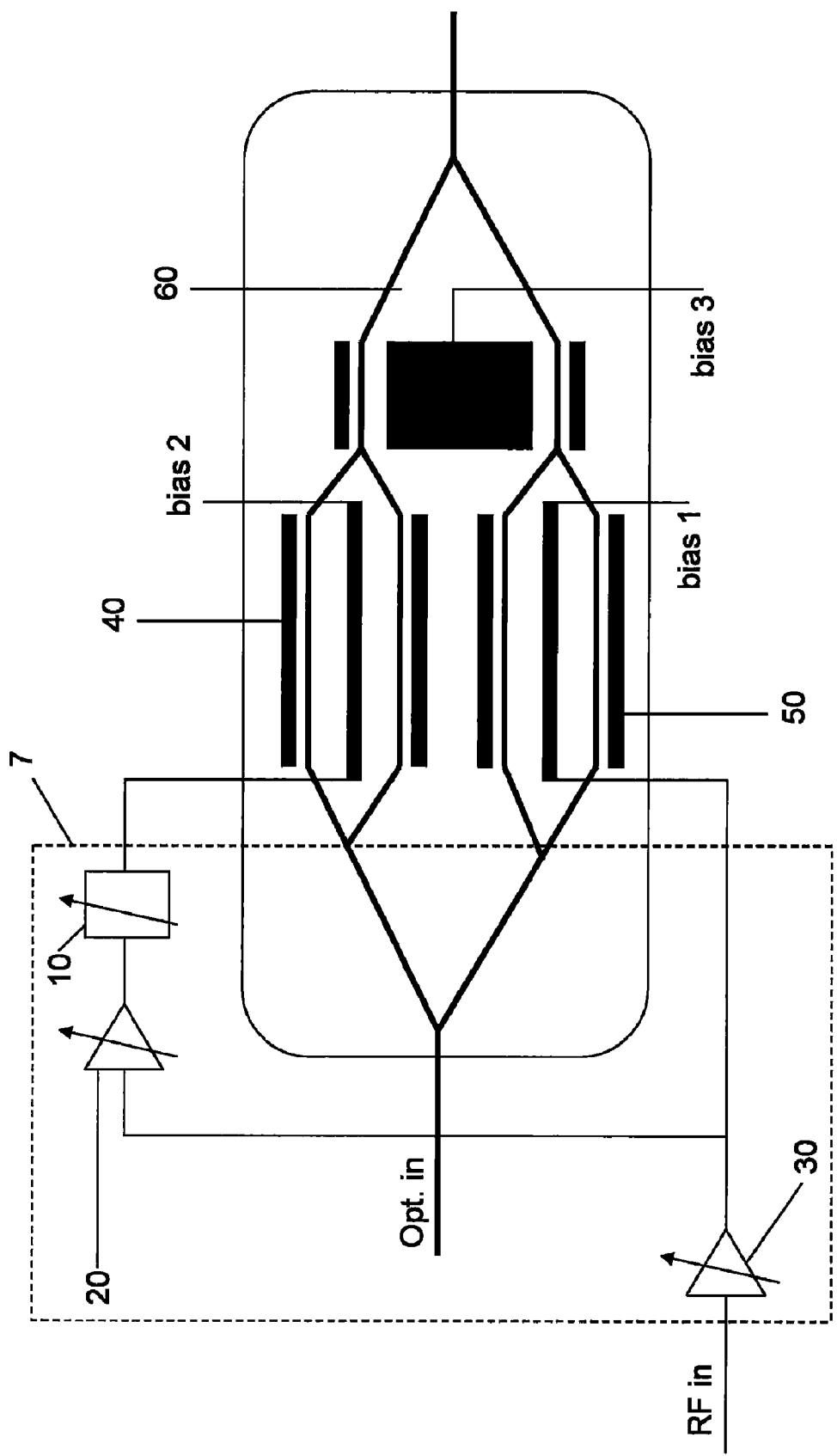
FIG. 1C illustrates another embodiment of an integrated dual parallel modulator system for generating flat optical frequency combs, and/or arbitrary shaped optical frequency combs indicating alternative locations of the variable gain drivers and phase shifter.

FIG. 1C illustrates another embodiment of an integrated dual parallel modulator system 100 for generating flat optical frequency combs, and/or arbitrary shaped optical frequency combs. FIG. 1C shows alternative locations of the variable gain drivers 20, 30 and the phase shifter 10 in the driver circuit 7. In this embodiment, the amplitude of an RF electrical input signal may be varied by variable gain driver 30. The output of the variable gain driver 30 is then split into two electrical signals. One of the split electrical signals may have its amplitude varied by variable gain driver 20 and its phase shifted by phrase shifter 10. The output of the phase shifter 10 serves as an electrical input into the MZI 40. The other split electrical signal from variable gain driver 30 serves as an electrical input to MZI 50. Also, an optical signal may be input to an optical input of the DPMZM 70. Thus, by varying the relative phase and amplitude of the electrical signals via phase shifter 10 and variable gain drivers 20, 30, the optical output of the DPMZM 70 (which comprises sub-MZIs 40, 50 nested within a larger MZI 60), may be configured to produce a desired output spectrum.

Figure 2A:
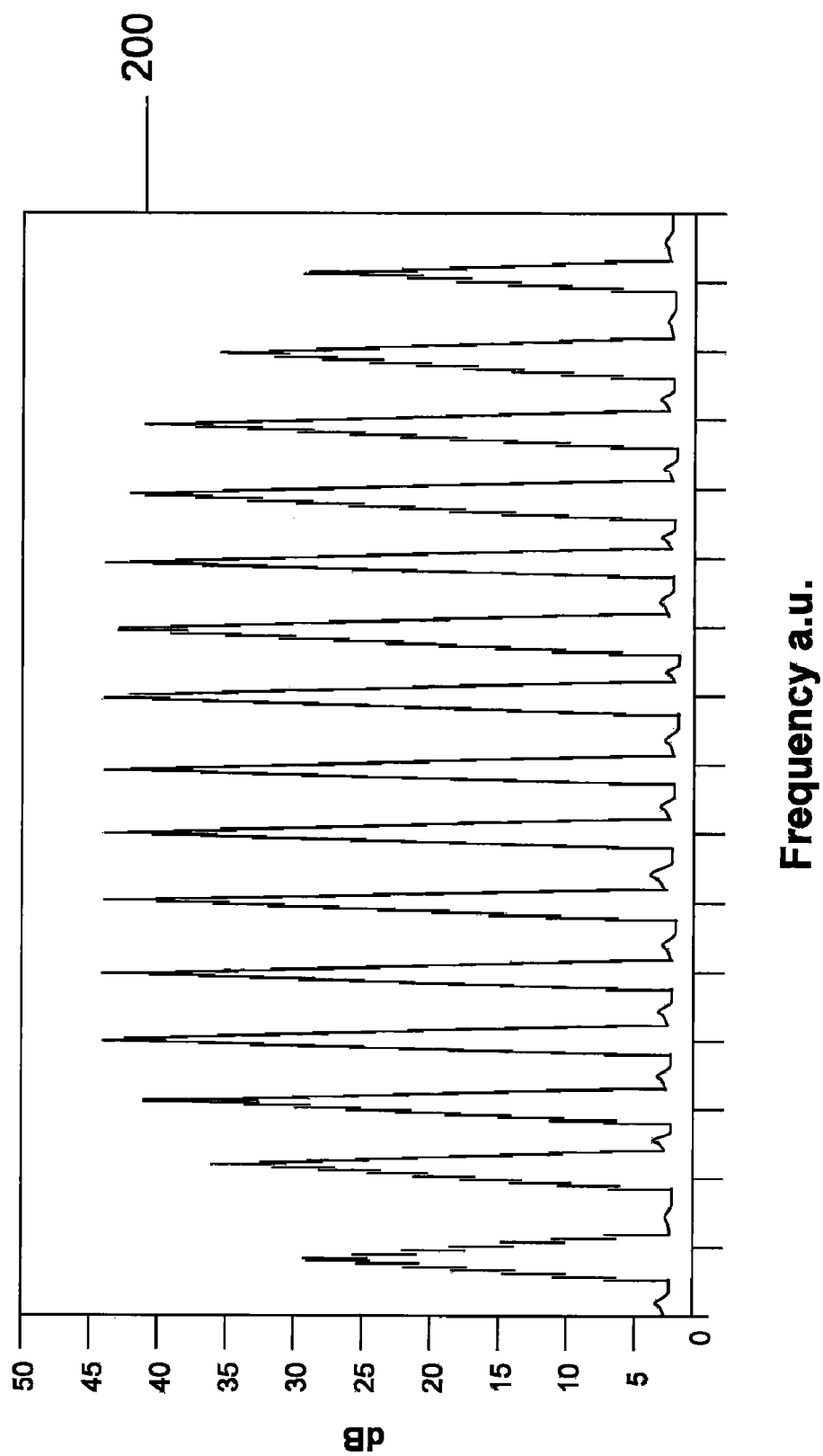
FIG. 2A illustrates an exemplary computer graphical user interface screen shot representing a simulation result of a spectrum optimized for 9 wavelengths wherein the maximum variations of the wavelengths is 1 dB.

FIG. 2A illustrates an exemplary desired output spectrum having a substantially flat spectral output comprising 9 or more sidebands resulting from embodiments of the DPMZM system 100. RF modulation based frequency comb generators (FCGs) are built around one or more phase and/or intensity modulators and may be driven with an RF voltage larger than $V_\pi$. As used herein, $V_\pi$ refers to the voltage that induces a 180° phase shift. The architecture of the DPMZM system 100 may possess characteristics that may be improvements over the simple modulators. As one example, DPMZM 100 has more parameters that can be used for optimization in comb generation than simple modulators. The layout of the DPMZM system 100 with the drive and biasing scheme as shown in FIGS. 1A-1C comprise three independent bias voltages, and two RF inputs that determine the particular operating configuration that the DPMZM can be set to.

In the analysis of the integrated DPMZM system 100, the following notations are employed: $\Theta_1$ and $\Theta_2$ are the sub-MZI 40, 50 bias angles, $\Psi$ the bias angle of the larger MZI 60, $\varphi$ is the RF phase difference between the two inputs, and $$\Delta\Phi_i = \frac{\pi}{2}\frac{V_i}{V_\pi}$$

is the phase modulation index of each sub-MZI, with $V_i$ being the applied RF voltage, and $V_\pi$ the half-wave voltage at the drive frequency. The relative output power $I_k$ in sideband k, (k=0, ±1, ±2 . . . ) is then given by the general expression:

$$I_k \propto J_k^2(\Delta\Phi_1)\cos^2\left(\frac{\Theta_1}{2}+k\frac{\pi}{2}\right)+J_k^2(\Delta\Phi_2)\cos^2\left(\frac{\Theta_2}{2}+k\frac{\pi}{2}\right)+ \quad (1)$$
$$2J_k(\Delta\Phi_1)J_k(\Delta\Phi_2)\cos\left(\frac{\Theta_1}{2}+k\frac{\pi}{2}\right)\cos\left(\frac{\Theta_2}{2}+k\frac{\pi}{2}\right)\cos(k\varphi+\Psi)$$

If the sub-modulators 40, 50 are biased at the same point and the driving amplitudes are equal (i.e., $\Theta_1=\Theta_2=\Theta$ and $\Delta\Phi_1=\Delta\Phi_2=\Delta\Phi$) the expression simplifies to:

$$I_k \propto \left[2J_k(\Delta\Phi)\cos\left(\frac{\Psi+k\varphi}{2}\right)\cos\left(\frac{\Theta}{2}+k\frac{\pi}{2}\right)\right]^2 \quad (2)$$

Thus, by analyzing the simplified expression of equation (2), the spectral response of the DPMZM system 100 may be adjusted by varying the bias angle of the larger MZI 60 and the RF phase difference between the two inputs (i.e., $\Psi$ and $\varphi$ respectively). For example, setting $\Psi$ and $\varphi$ at 90 degrees, and biasing the sub-MZIs at quadrature ($\Theta=\pi/2$) results in SSB modulation (i.e. one of the two first order sidebands k=1 or k=−1 disappears), whereas a minimum bias on the sub-MZIs produces carrier suppressed SSB or frequency shifting. That is, biasing at minimum results in carrier suppressed single side-band. Quadrature biasing all three MZIs with differentially driven RF ports results in pure phase modulation. More degrees of freedom are available for spectral shaping when the two RF driving powers are different.

Therefore, if we use all the parameters available, it is possible to spectrally shape the output, to generate a very flat frequency comb. The sideband intensities calculated in equation (1) above have six parameters that can be used to optimize the spectrum: the two drive voltages, the phase between them, the bias voltages in the sub-MZIs 40, 50, and the bias of the large MZI 60. Bias points other than max, min and quadrature tend to be more difficult to stabilize. Therefore, special bias controllers may be used to stabilize bias points other than max, min and quadrature. The embodiments of the DPMZM system 100 show that a flat comb can be generated with the DPMZM 70 biased at max, min and quadrature. In order to quantify the flatness (ΔI in dB) of the spectrum, the ratio of the largest component to the smallest component out of the desired number of wavelengths may be computed. An optimization routine that minimizes ΔI while maximizing the output power may then be applied to obtain a flat spectral output.

Figure 2B:
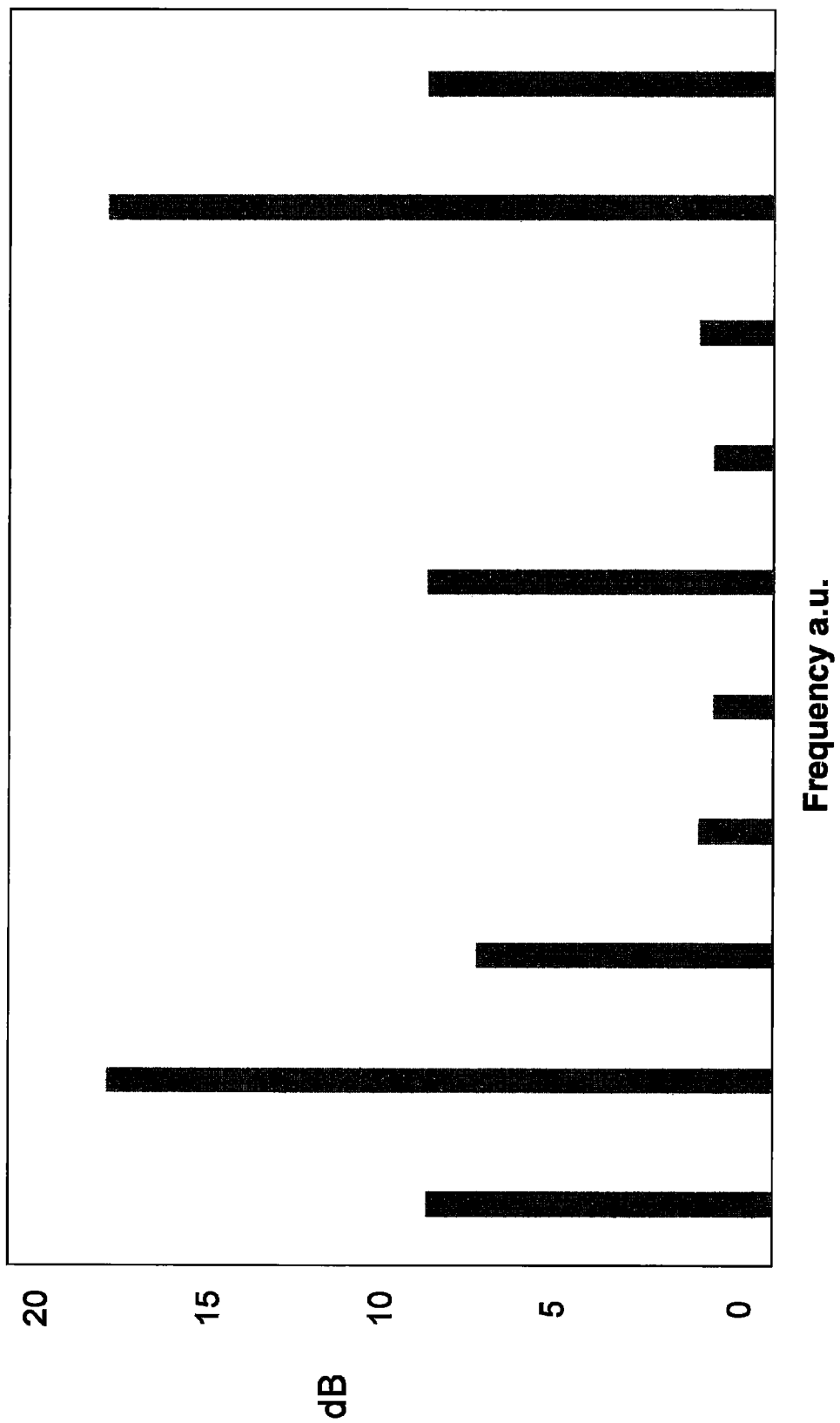
FIG. 2B illustrates an exemplary simulation results screen of an output spectrum optimized for millimeter wavelength generation, 8th harmonic, wherein the desired harmonics are approximately 10 dB above the rest.

The output of the DPMZM 70 can also be optimized for other spectral shapes due to the large number of parameters available in the dual parallel modulation system 100. For example, the output of a DPMZM may be optimized to selectively generate a higher harmonic of the modulation frequency well into the millimeter-wave region, or to perform spectral shaping in arbitrary waveform/pulse generation applications. As one example, optimum parameters found for generating the 8th harmonic of the modulation frequency are: $3.3V_\pi$ for amplitude of the first drive signal, $3.3V_\pi$ for amplitude of the second drive signal, and 160 degrees for the phase difference. The simulation using such parameters are illustrated in FIG. 2B, wherein most of the power is in the desired harmonics (order ±4). As shown, when the spectrum is optimized for a millimeter-wave generation, 8th harmonic, the desired harmonics are approximately 10 dB above the rest of the other harmonics.

FIG. 2A also illustrates an example of a computer graphical user interface screen shot 200 representing a simulation result of a spectrum optimized for 9 wavelengths. The total power variation among the 9 wavelengths is less than 1 dB. The optimum values of the parameters used to achieve these wavelengths are: RF drive voltages $V_1=3.4V_\pi$; $V_2=2.25V_\pi$; RF phase difference $\phi=155°$; third bias angle $\Psi=0°$ i.e. maximum, and the sub-modulators set at $\Theta=90°$ i.e. quadrature. These results are frequency independent. Thus, as long as the desired modulation index and phase can be achieved, the frequency comb generator will generate the same spectral shape at any modulating frequency and optical wavelength.

Figure 3:
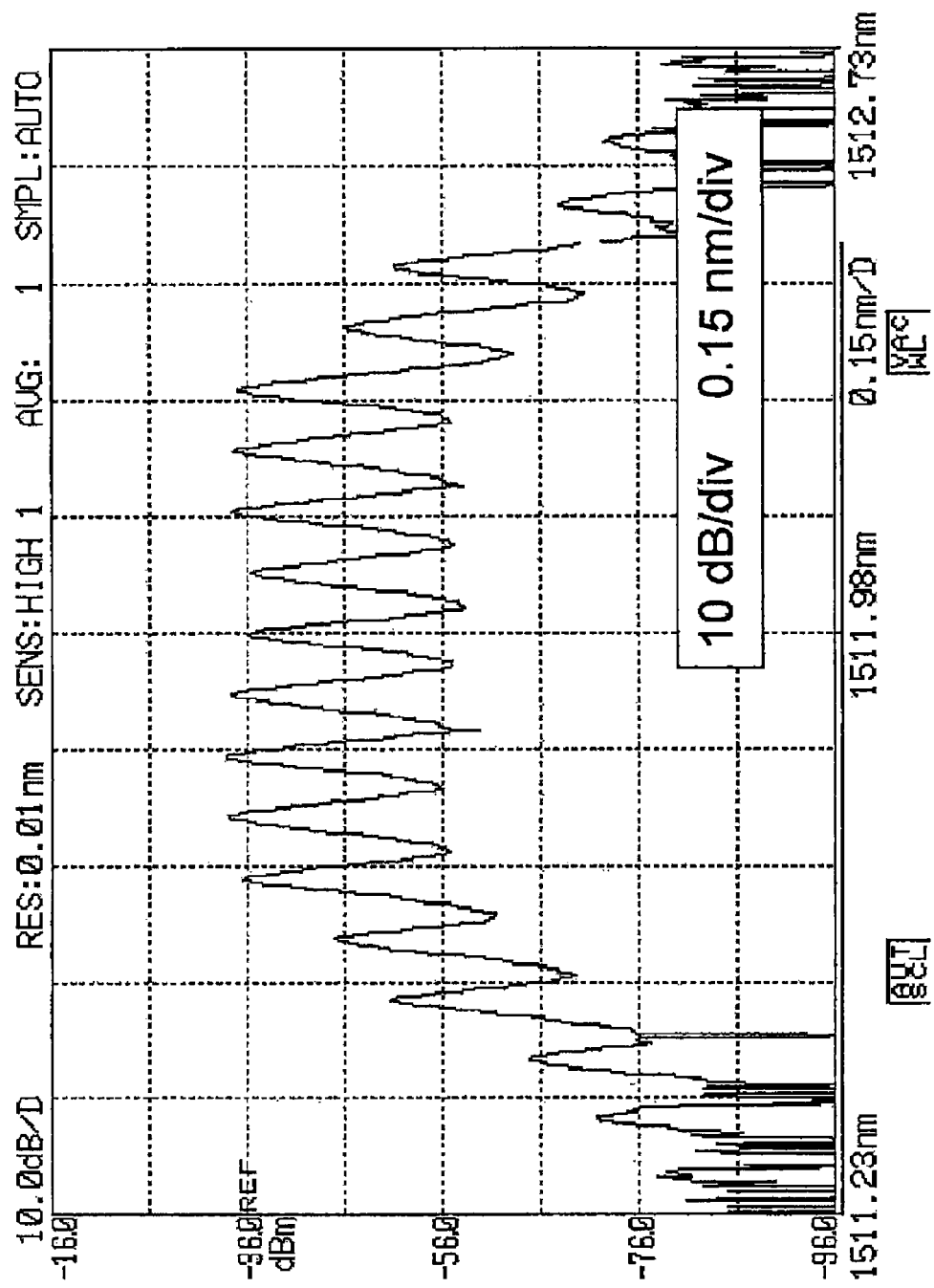
FIG. 3 illustrates a measured output spectrum optimized for 9 wavelengths that exhibits a maximum variation of 2 dB.

FIG. 3 illustrates a measured output spectrum optimized for 9 wavelengths that exhibits a maximum variation of 2 dB. To generate higher order sidebands, high RF drive power in conjunction with a low $V_\pi$ may be required. Some factors may affect the generation of higher order sidebands. Such factors may include the output power generated by the RF amplifiers 20, 30, the $V_\pi$ employed by the sub-MZIs 40, 50 of the DPMZM 70, the modulation frequency, the input optical power, the resolution of the optical spectrum analyzer, and/or the actual drive and bias parameters. As one example, the RF amplifiers may be limited to approximately 2.9 times the $V_\pi$ for the sub-MZIs. The sub-MZIs 40, 50 may employ a $V_\pi$ of approximately 6 V at DC. A modulation frequency of approximately 10 GHz, and the input optical power of −9 dBm at a wavelength of 1512 nm may be employed. The optical spectrum analyzer may be set to a resolution of 0.01 nm (i.e., 1.25 GHz). The solution space can also be re-optimized in the context of available drive power. The actual drive and bias parameters may be set as follows: RF drive voltages $V_1$~2.8 $V_\pi$, $V_2$~0.8 $V_\pi$, RF phase difference $\phi$~−43°, third bias angle, $\Psi$~−15°) and both sub-MZIs biased at $\Theta=75°$. As illustrated in FIG. 3, a maximum variation of less than 2 dB may be achieved over 9 wavelengths when such factors and/or parameters are used in the DPMZM system 100.

Figure 4:
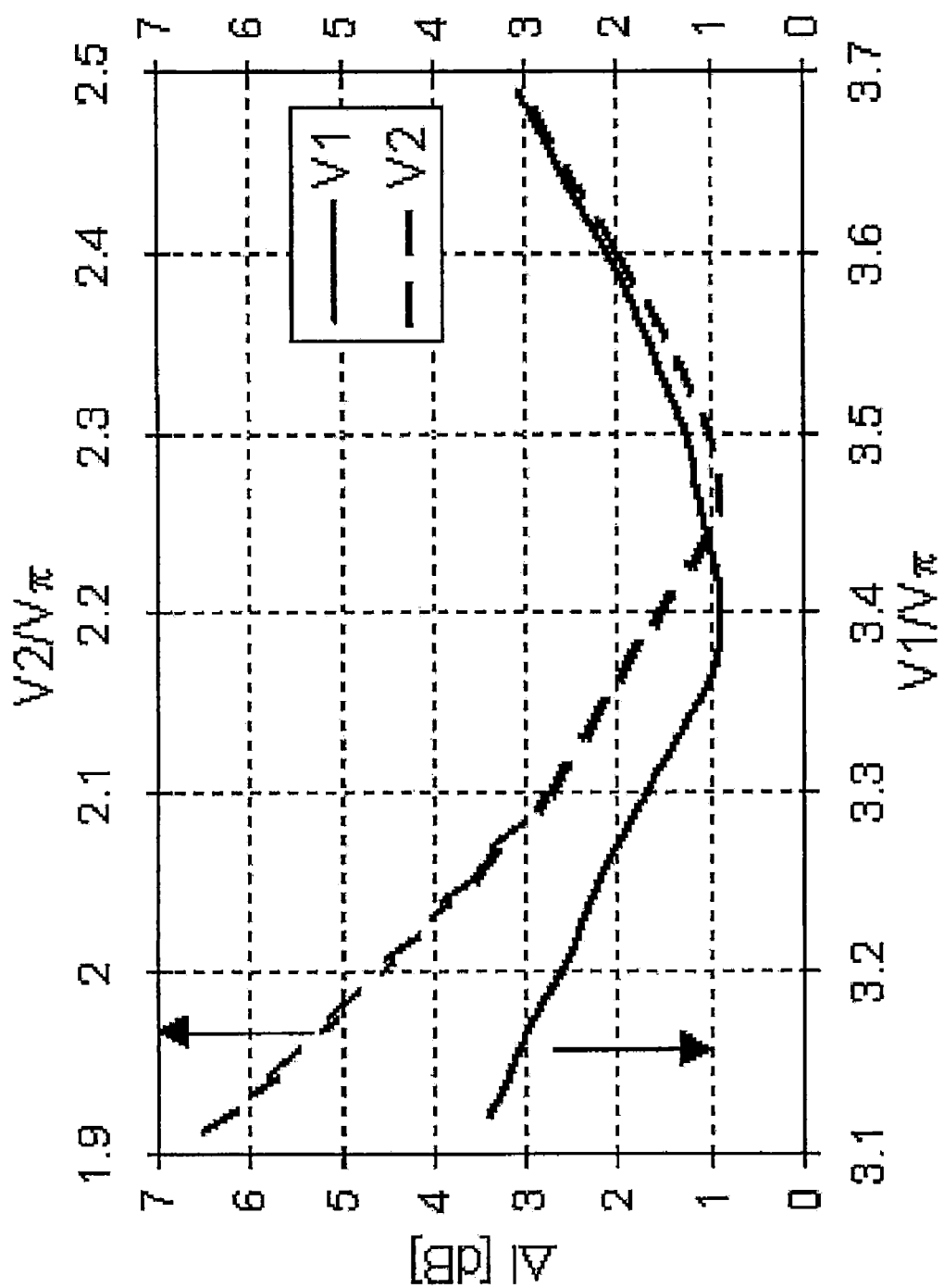
FIG. 4 illustrates the variations of output power over 9 wavelengths when the two RF drive voltages are varied near the optimum value.

FIG. 4 illustrates the variations of output power (i.e., ΔI) over 9 wavelengths when the two RF drive voltages are varied near their optimum values. Increasing the number of channels in the comb may increase the sensitivity of the output to parametric variations. Therefore, when the numbers of channels are increased, parametric controls and stabilization loops may be tightened to compensate for the increased sensitivity of the channels. Thus, FIG. 4 shows a plot of the variation of the calculated maximum power ratio among the desired 9 wavelengths (ΔI in dB), with respect to small variations in the two RF voltages applied to the sub-MZIs 40, 50, in the vicinity of an optimized operating point. FIG. 4 also reveals that the variations in the drive voltages would have to be restricted to less than 0.1 $V_\pi$ if a flatness of better than 1 dB is desired. However, a total variation of up to approximately 0.5 $V_\pi$ in the drive voltages may achieve a flatness in a, perhaps, acceptable 2-3 dB range.

Figure 5:
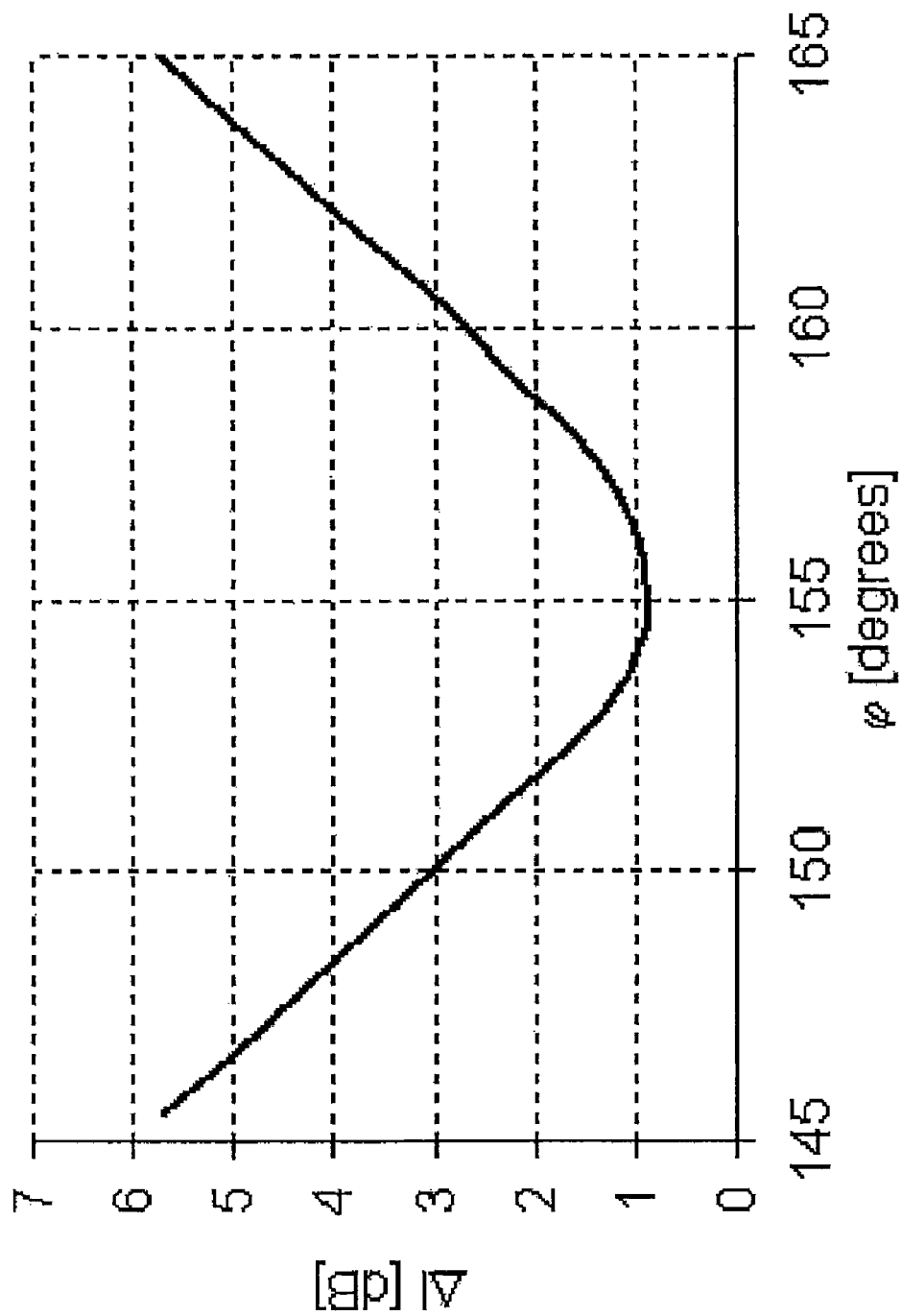
FIG. 5 illustrates a variation of output power over 9 wavelengths when the RF phase differences between the two input drives are varied around the optimum value.

FIG. 5 illustrates a variation of output power over 9 wavelengths when the RF phase differences between the two input drives are varied around the optimum value. All other parameters may be held at their optimum values. FIG. 5 shows that in order to achieve a flatness in a range of 2-3 dB, the phase difference variation may be restricted to within an interval of 10 degrees. Since bias controllers can maintain the proper bias points with high precision, the sensitivity to bias is not an issue for the embodiments of the DPMZM system 100 described herein.

Figure 6A:
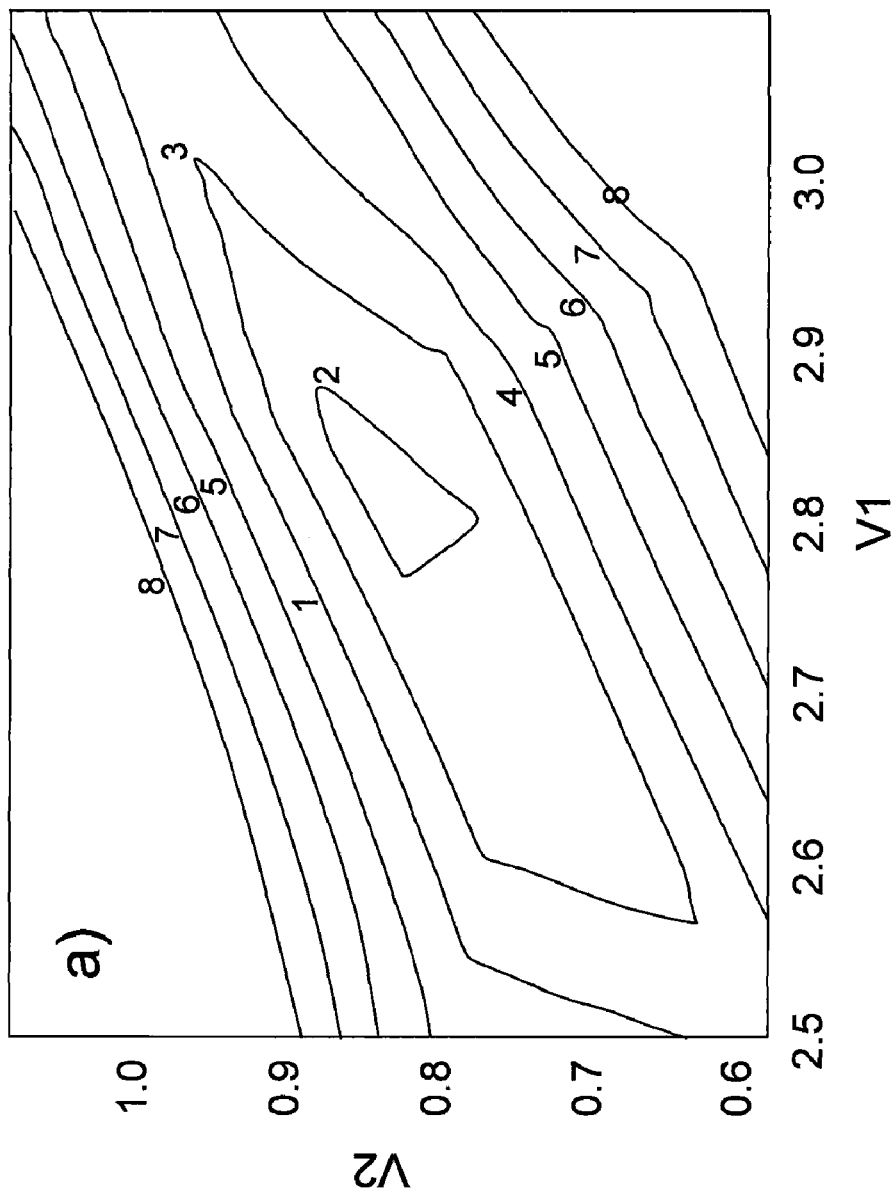
FIG. 6A illustrates a contour plot corresponding to a variation of a calculated maximum power ratio among the desired 9 wavelengths, with respect to small variations in RF voltages applied to sub-MZIs in the vicinity of an optimized operating point.

FIG. 6A illustrates a contour plot corresponding to the variation of the calculated maximum power ratio among the desired 9 wavelengths (ΔI in dB), with, respect to small variations in the two RF voltages applied to the sub-MZIs 40, 50, in the vicinity of an optimized operating point. In FIG. 6A, the variations in the drive voltages may be restricted to less than 0.1 $V_\pi$ if a flatness of less than 2 dB is desired.

Figure 6B:
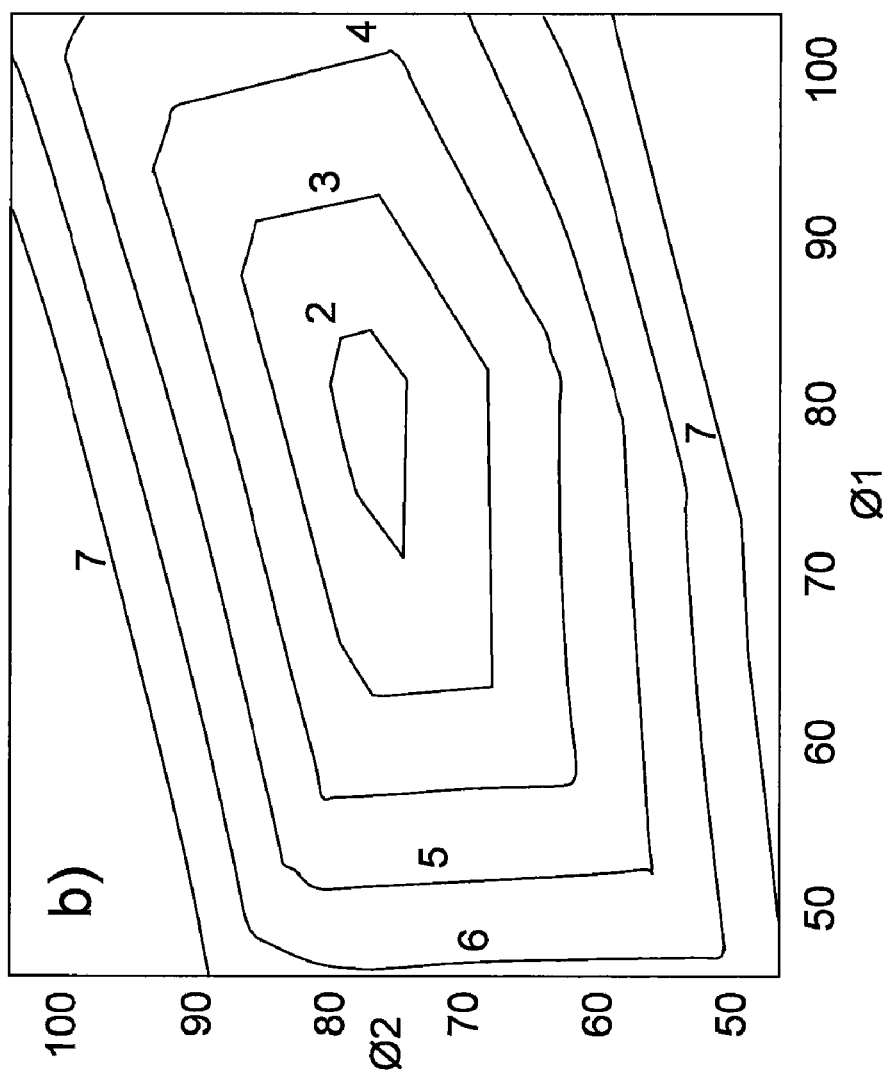
FIG. 6B illustrates a contour plot corresponding to a variation of output power over 9 wavelengths when the sub-MZIs bias angles are varied around an optimum value.

FIG. 6B illustrates a contour plot corresponding to a variation of output power over 9 wavelengths when the sub-MZIs 40, 50 bias angles are varied around an optimum value. In FIG. 6B, the bias angle variation can be restricted to within an interval of 5 degrees. These tolerance values and even lower ones may be achieved by conventional Manufacturing imperfections may adversely impact the sensitivity of the DPMZM system 100. For example, if there is a slight power imbalance in the y-junctions, then the analysis may be modified to include various weighting terms to account for this imbalance. Manufacturing imperfections leading to different EO efficiencies or frequency dependencies for the two sub-MZIs require the use of different values for $V_\pi$ in computing the modulation indices $\Delta\Phi_1$ and $\Delta\Phi_2$. Therefore, the actual applied voltages may have to be adjusted slightly to compensate for this difference. Similarly, small differences in path lengths between the two RF drives would have to be accommodated for in the phase difference $\phi$.

The embodiments of the DPMZM system 100 described above present a novel, compact technique to generate a flat optical frequency comb by driving a DPMZM under optimal conditions. A 1 dB power deviation among 9 or 11 channels may be achieved for certain applications. Further, a channel uniformity of better than 2 dB for 9 channels that may be sufficient for some practical WDM applications can be achieved.

The techniques presented above with respect to the embodiments of the DPMZM system 100 provide a user with more parameters for optimization and adjustment, and also provide the advantage of greater ease of matching and maintaining the RF phase between ports relative to known methods for generating OFCs. While there are many more local minimums in the multidimensional parameter search space, the set of solutions presented in the embodiments herein serve as examples of the capabilities of the DPMZM methods and systems. The above described methods and systems can further benefit from devices with a lower $V_\pi$ at high frequencies. It is contemplated that a person skilled in the art may use other methods to expand the spectrum, such as: nonlinear generation of harmonics, or multiple passes of the optical signal through the modulator via a fiber loop external resonator. The embodiments described herein may be suited for ultra-fine DWDM, because of the lower modulation frequency needed. Frequency spacings in the range of 25 GHz to 50 GHz (with frequency doubling bias) are also achievable.

Figure 7:
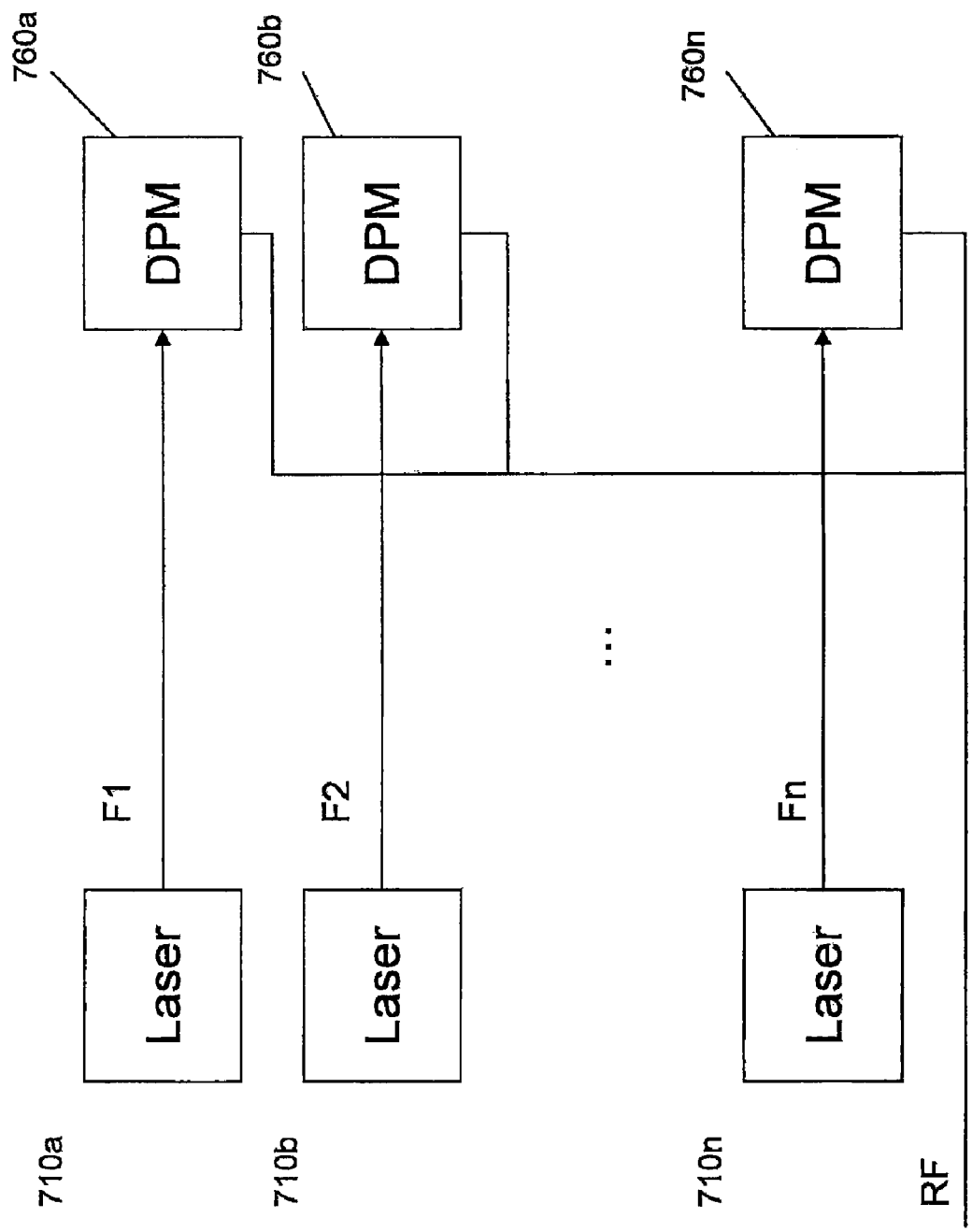
FIG. 7 is a block diagram of a system for generating multiple optical frequency combs according to an embodiment of the invention.

Those of skill in the art will recognize that applications requiring large numbers of channels can be realized by using multiple optical sources (e.g., multiple lasers) with each of the optical sources emitting light at different wavelengths and each driving a separate DPMZM. An example of such an embodiment is illustrated in FIG. 7, which includes, a plurality of lasers 710a-n each driving separate DPM systems 760a-n, where each of the DPM systems 760a-n is configured to produce an optical frequency comb as discussed above in connection with FIGS. 1a-1c. The lasers 710a-n are set at separate frequencies F1-Fn which are spaced apart. A single radio frequency signal RF (which, as discussed above determines the spacing of the channels of the comb) drives each of the DPM systems 760a-n such that the channel spacing in each of the optical frequency combs output by the DPM systems 760a-n is identical. The difference in frequency between the lasers 710a-n is selected such that the spacing between the uppermost channel in one comb and the lowermost channel in an adjoining comb is approximately the same as the spacing between channels in a single comb. Synchronizing the lasers to achieve this result requires some effort. An alternative to the arrangement illustrated in FIG. 7 which obviates the need for such synchronization is illustrated in FIG. 8, which employs cascaded dual parallel modulators.

Figure 8:
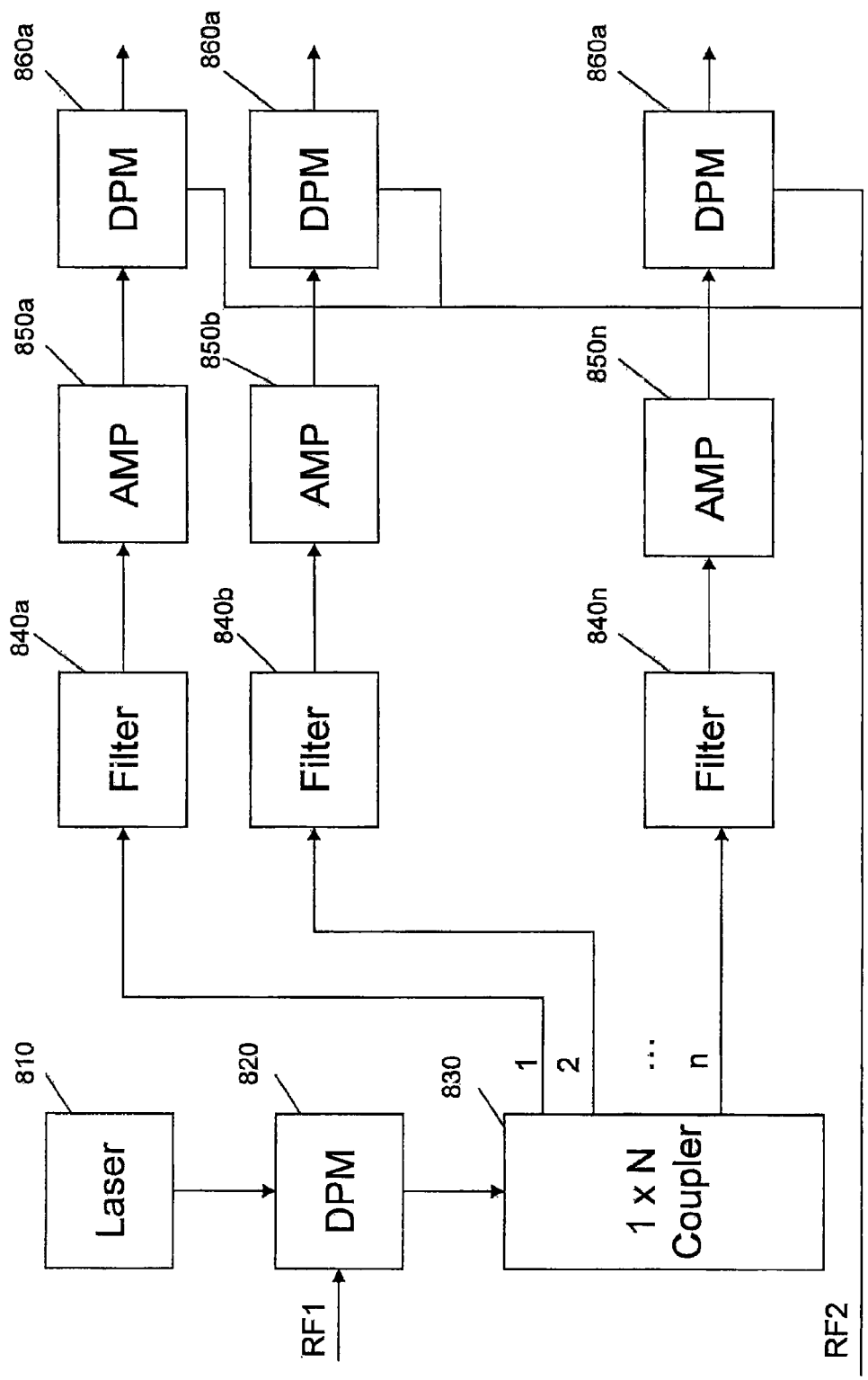
FIG. 8 is a block diagram of a second system for generating multiple optical frequency combs according to an embodiment of the invention.

In the system shown in FIG. 8, a single laser 810 drives the optical input of a DPM system 820 (which again is configured to produce an optical frequency comb as discussed above in connection with FIGS. 1a-1c), and a signal RF1 drives the electrical input, to produce a first optical frequency comb. The optical comb output of the DPM 820 is input to a 1×N coupler 830. Each of the outputs of the 1×N coupler 830 is input to a respective bandpass filter 840a-n. Each of the filters 840a-n are configured to pass a different channel of the optical frequency comb. The output of the filters 840a-n are then input to a respective amplifier 850a-n and then to a respective DPM system 860a-n. A second, lower frequency signal RF2 drives each of the DPM systems 860a-n. The output of the DPMs 860a-n will be optical frequency combs with channel spacing in each comb equal to the frequency of RF2, and the frequency spacing between neighboring optical frequency combs controlled by RF1. Thus, by making appropriate choices for RF1 and RF2, a plurality of optical frequency combs with channel spacing in any one comb equal to a channel spacing between a lowest frequency channel in one comb and a highest frequency channel in a neighboring comb can be achieved without the need to synchronize multiple laser sources.

Although the present invention has been described in connection with the illustrated embodiments, it will be appreciated and understood that modifications may be made without departing from the spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for generating an optical frequency comb, comprising:
   inputting a first optical signal to an optical input of a dual parallel modulator, the dual parallel modulator comprising first and second interferometers nested within a third interferometer;
   inputting a first electrical signal at a first amplitude into an electrical input of the first interferometer; and
   inputting a second electrical signal at a second amplitude into an electrical input of the second interferometer, the second electrical signal having a relative phase difference from the first electrical signal, the second electrical signal having a same frequency as the first electrical signal;
   wherein the amplitudes of the first and second electrical signals and the relative phase difference between the first and second electrical signals are controlled so that the optical output of the third interferometer is an optical frequency comb with a desired output spectrum.

2. The method of claim 1, wherein the first interferometer, second interferometer, and the third interferometer are formed on a single substrate.

3. The method of claim 1, wherein the desired output spectrum of the optical frequency comb comprises a plurality of peaks of similar amplitudes at evenly spaced wavelengths.

4. The method of claim 3, wherein a total power variation between the plurality of peaks is less than 3 dB.

5. The method of claim 3, wherein the total power variation between the plurality of peaks is less than 1 dB.

6. The method of claim 3, wherein the plurality of peaks comprises nine peaks.

7. The method of claim 3, wherein the plurality of peaks comprises 11 peaks.

8. The method of claim 1, wherein the first interferometer, second interferometer and third interferometer comprise Mach-Zehnder interferometers.

9. The method of claim 1, further comprising:
   optimizing the output spectrum by modifying bias voltages associated with the first, second and/or third interferometers wherein the bias voltages comprises at least one of max, min and/or quadrature in order to produce stabilized bias points.

10. The method of claim 1, wherein the first optical signal is derived from an output of a dual parallel modulator configured to generate an optical frequency comb.

11. The method of claim 1, wherein the first optical signal is generated from one of a plurality of lasers, each of the lasers being configured to output an optical signal at a different wavelength.

12. A system for generating an optical frequency comb, comprising:
   a dual parallel modulator comprising first and second interferometers nested within a third interferometer; and
   a driver circuit with an input terminal connectable to an electrical signal at a radio frequency, the driver circuit being configured to output a first output signal having a first amplitude at a first output terminal and a second output signal having a second amplitude at a second output terminal, the first output signal and the second output signal having a relative phase difference;
   wherein the first output terminal is connected to an electrical input of the first interferometer and the second output terminal is connected to an electrical input of the second interferometer and wherein the first and second amplitudes and the relative phase difference between the first and second output signals result in the optical output of the third interferometer being in the form of an optical frequency comb having a desired output spectrum.

13. The system of claim 12, wherein the driver circuit comprises a phase shifter with an input connected to the input terminal, a first amplifier with an input connected to an output of the phase shifter and an output connected to the first output terminal, and a second amplifier with an input connected to the input terminal and an output connected to second output terminal.

14. The system of claim 12, wherein the driver circuit comprises a first amplifier with an input connected to the input terminal, a phase shifter with an input connected to an output of the first amplifier and an output connected to the first output terminal, and a second amplifier with an input connected to the output of the first amplifier and an output connected to the second output terminal.

15. The system of claim 12, wherein the driver circuit comprises a first amplifier with an input connected to the input terminal, a phase shifter with an input connected to an output of the first amplifier and an output connected to the first output terminal, and a second amplifier with an input connected to an output of the first amplifier and an output connected to the second output terminal.

16. The system of claim 12, wherein the first interferometer, the second interferometer, and the third interferometer are formed on a single substrate.

17. The system of claim 12, wherein the desired output spectrum of the optical frequency comb comprises a plurality of peaks of similar amplitudes at evenly spaced wavelengths.

18. The system of claim 17, wherein a total power variation between the plurality of peaks is less than 3 dB.

19. The system of claim 17, wherein the total power variation between the plurality of peaks is less than 1 dB.

20. The system of claim 17, wherein the plurality of peaks comprises nine peaks.

21. The system of claim 17, wherein the plurality of peaks comprises 11 peaks.

22. The system of claim 12, wherein the first interferometer, second interferometer and third interferometer comprise Mach-Zehnder interferometers.

23. The system of claim 12, further comprising:
   a coupler connected to receive the optical frequency comb output of the dual parallel modulator;
   a plurality of bandpass filters, each of the filters being configured to pass a frequency band of a different channel; and
   a plurality of additional dual parallel modulators each connected to a respective one of a plurality of driver circuits, each of the plurality of dual parallel modulators and respective driver circuits being configured to output an optical frequency comb.

24. The system of claim 23, further comprising a plurality of optical amplifiers, each of the amplifiers being connected between the coupler and a respective additional dual parallel modulator.

25. The system of claim 12, further comprising:
   a first optical source connected to an optical input of the dual parallel modulator, the first optical source being configured to emit light at a first wavelength;
   a second optical source configured to emit light a second wavelength different from the first wavelength;
   a second dual parallel modulator with an optical input connected to the second optical source; and
   a second driver circuit connected to the second dual parallel modulator;
   wherein the second dual parallel modulator generates an output in the form of an optical frequency comb having an output spectrum different from the output spectrum of the dual parallel modulator to which the first optical source is connected.

* * * * *